United States Patent [19]

Foster

[11] 4,102,175
[45] Jul. 25, 1978

[54] RESPONSE TIME VERIFICATION OF IN SITU HYDRAULIC PRESSURE SENSORS IN A NUCLEAR REACTOR

[75] Inventor: Carlton G. Foster, Mountain View, Calif.

[73] Assignee: Electric Power Research Institute, Inc., Palo Alto, Calif.

[21] Appl. No.: 732,560

[22] Filed: Oct. 15, 1976

[51] Int. Cl.² .............................................. G01L 27/00
[52] U.S. Cl. .................................... 73/4 R; 176/19 J
[58] Field of Search ............... 73/4 R; 176/19 R, 19 J

[56] References Cited

U.S. PATENT DOCUMENTS 3,159,995  12/1964  Elliott ........................................ 73/4

Primary Examiner—James J. Gill
Attorney, Agent, or Firm—Townsend and Townsend

[57] ABSTRACT

Method and apparatus for verifying response time in situ of hydraulic pressure and pressure differential sensing instrumentation in a nuclear fluid circuit is disclosed. Hydraulic pressure at a reference sensor and at an in situ process sensor under test is varied according to a linear ramp. Sensor response time is then determined by comparison of the sensor electrical analog output signals. The process sensor is subjected to a relatively slowly changing and a relatively rapidly changing hydraulic pressure ramp signal to determine an upper bound for process sensor response time over the range of all pressure transients to which the sensor is required to respond. Signal linearity is independent of the volumetric displacement of the process sensor. The hydraulic signal generator includes a first pressurizable gas reservoir, a second pressurizable liquid and gas reservoir, a gate for rapidly opening a gas communication path between the two reservoirs, a throttle valve for regulating rate of gas pressure equalization between the two reservoirs, and hydraulic conduit means for simultaneously communicating a ramp of hydraulic pressure change between the liquid/gas reservoir and both a reference and a process sensor. By maintaining a sufficient pressure differential between the reservoirs and by maintaining a sufficient ratio of gas to liquid in the liquid/gas reservoir, excellent linearity and minimal transient effects can be achieved for all pressure ranges, magnitudes, and rates of change of interest.

18 Claims, 3 Drawing Figures

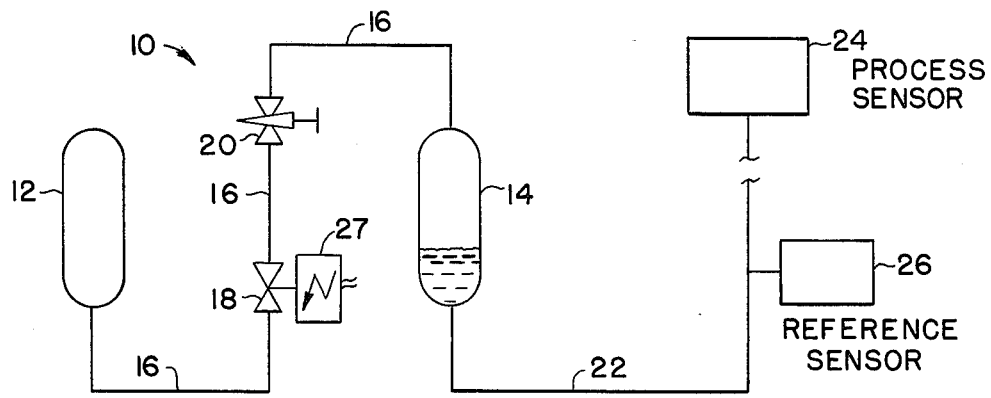
FIG._1.
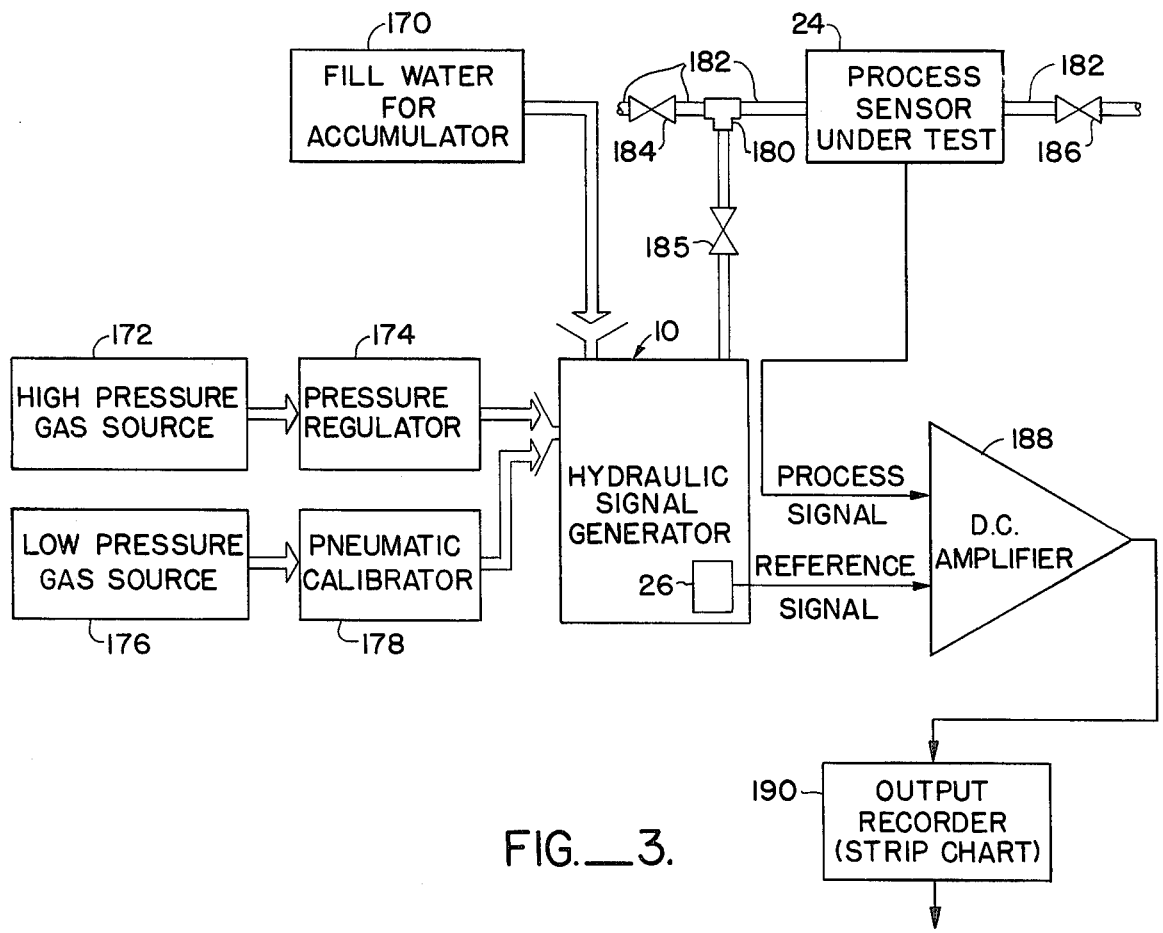
FIG._3.

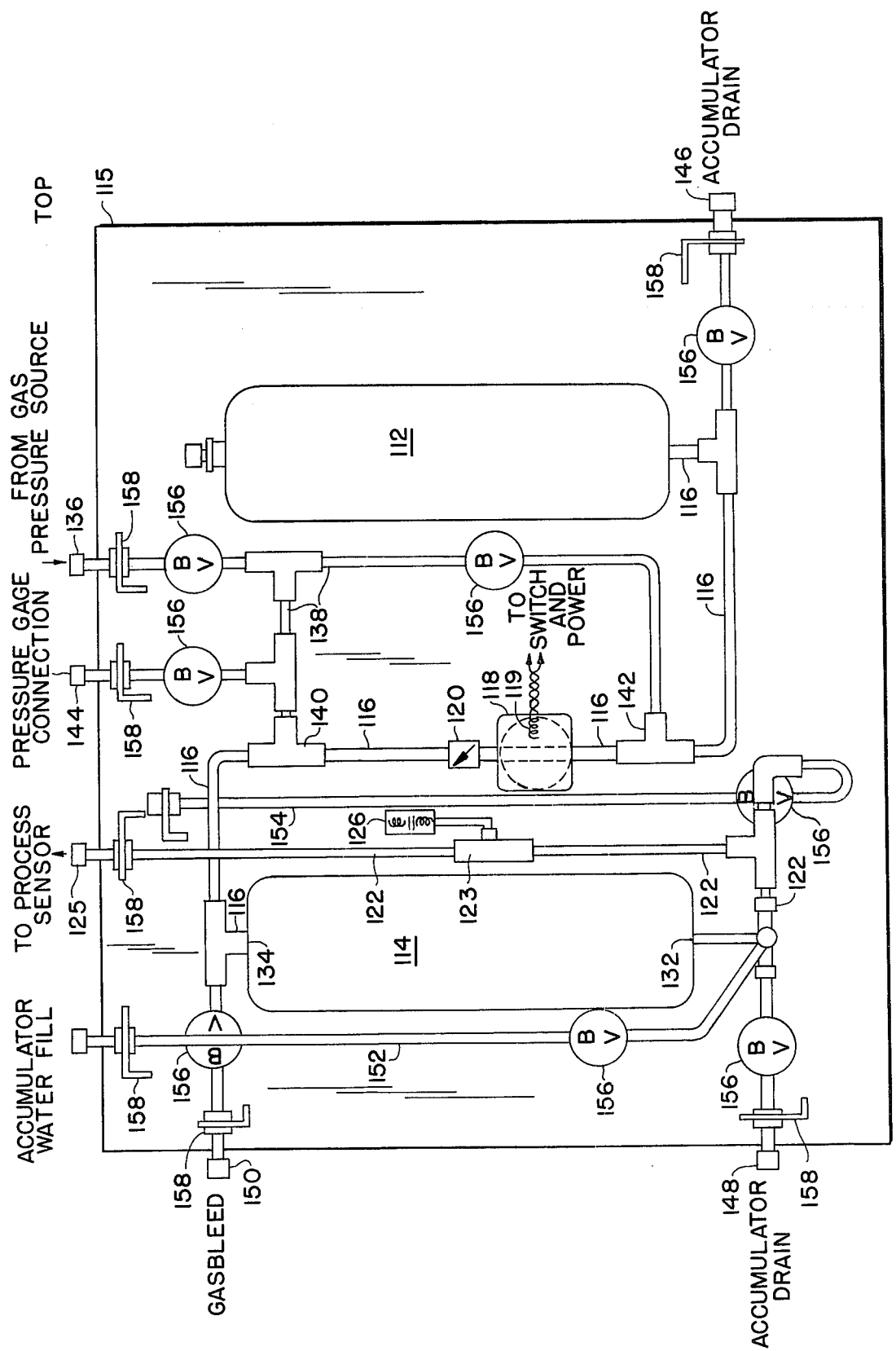
FIG._2.

RESPONSE TIME VERIFICATION OF IN SITU HYDRAULIC PRESSURE SENSORS IN A NUCLEAR REACTOR

This invention was made under contract with or supported by The Electric Power Research Institute, Inc.

BACKGROUND OF THE INVENTION

This invention relates to in situ time response testing of hydraulic sensors in a nuclear reactor fluid circuit, and particularly to response time testing of pressure and differential pressure sensors in light water nuclear reactors.

The United States Nuclear Regulatory Commission (NRC) requires periodic testing of the dynamic response characteristics of hydraulic instrumentation to insure reliable and safe nuclear operation. Specific industry response time standards set forth, for example, in IEEE Standard 338-1975, entitled "Criteria for the Periodic Testing of Nuclear Generating Station Class 1E Power and Protection Systems", state in part that sensors must be periodically tested if response time thereof are shown to be critical to reactor safety or are known to comprise a significant part of the overall system response time and may be expected to suffer response time degradation. For example, the permissible overall response time of instruments to a contingency, such as the sudden loss of coolant, might be less than two seconds. Selected instruments must generally react in a small fraction of the overall response time. Failure to initiate safety procedures within the tolerable response time could cause substantial damage.

Heretofore, the nuclear industry has specified sensors especially designed and adapted for use in the nuclear environment. Close response time tolerance has been presumed from instrument design. In recent years, the nuclear industry has been permitted to specify general purpose process sensors having originally been intended for non-nuclear applications. Data respecting response time for such instruments are often unavailable or are not based on uniform criteria. In addition, available response time data are typically estimated based on laboratory rather than field conditions. Thus, there has been no guarantee that the data provided if any, are reliable.

With the recent promulgation of the NRC periodic testing requirement, it has been necessary to devise procedures and provide instrumentation to monitor and to verify sensor response time. Techniques requiring removal of the sensor from the reactor, and therefore decontamination prior to examination and testing, are considered unreliable and generally impractical, since removal and reinstallation of the instrument could result in damage to the instrument and disturbance of the system and expose workmen to hazardous doses of radiation. Nevertheless, no suitable instrument has heretofore been made known for field testing the time response of in situ reactor pressure sensors.

Reliable data collection also requires an accurate and repeatable testing technique. A number of testing techniques are suggested by transient analysis. These include the impulse response test, the step response test, the sinusoidal perturbation test, and the ramp response test. The various testing techniques enjoy particular well-established theoretical advantages and particular significant practical disadvantages. In the first three techniques, a suitable hydraulic test signal is extremely difficult to generate with any degree of reliability and repeatability for the tests in the time period of interest. (Typically, sensor time responses of interest are less than 100 milliseconds, so system time resolution must be considerably shorter). Moreover, it is quite often difficult to relate the data to actual accident conditions.

The ramp function, however, is found to be a particularly attractive test function because it approximates and simulates many of the accident orifices which might occur, for example, by a sudden loss of pressure. Furthermore, time delay of a ramp function is readily measureable in comparison with a known reference.

To generate a reliable ramp function, a hydraulic signal generator is required which is capable of producing a linear increase and decrease in hydraulic pressure, without transient disturbance, over a wide pressure amplitude range and over a broad dynamic rate range. In addition, the hydraulic generator must be capable of producing the desired signals in a field environment. A particular requirement is a capability to produce linear, transient free hydraulic ramp signals which are independent of the volumetric displacement of the sensor.

Single pressurized hydraulic (i.e., liquid-filled) or pneumatic-hydraulic (i.e., gas-liquid filled) accumulators with a solenoid gate valve throttle valve interposed between the accumulator and sensors have been suggested as a means for generating the ramp hydraulic signal. Such apparatus are found to be inadequate in the application of present interest for a variety of reasons. First, and particularly in the increasing pressure mode, shock waves transmitted through the hydraulic fluid create pressure oscillations rather than a smooth ramp at the hydraulic output. Such oscillatory transients are relatively so severe as to hamper accurate and repeatable time delay measurement.

Second, in the decreasing pressure mode, pressure is changed with such rapidity that controllability can not be attained. Repeatable and accurate time delay measurement is not possible without relatively elaborate computation and is considered impractical for the purposes of this procedure.

Third, it has been likewise found to be impossible to attain broad dynamic rate ranges with such single hydraulic accumulators because of their extreme sensitivity to the volumetric displacement of the process sensor over the single pressure range.

It is therefore an object of the present invention to provide a relatively simple apparatus and a readily understood method for measuring the time response of in situ hydraulic sensors in a reactor to verify sensor time response operability as required by nuclear safety standards.

It is a further object to provide a portable instrument which can be employed in field testing of hydraulic sensors in a nuclear reactor.

A particular object of the invention is to provide an accurate indication of time delay between a change of the hydraulic pressure input to a sensor and the corresponding output signal indication.

A specific object is to provide a hydraulic signal generator capable of producing substantially linear and transient-free increasing and decreasing hydraulic pressure ramp signals independent of the volumetric displacement of the process sensor.

A further specific object is to provide a hydraulic ramp signal generator capable of producing repeatable signals over a broad amplitude and rate of change dynamic range, and particularly a generator which is capable of repeatably producing a broad range of pressure change rates at both low and high pressures.

SUMMARY OF THE INVENTION

According to the present invention in situ response time of hydraulic pressure and pressure differential sensors in a nuclear reactor fluid circuit is verified. A linear, transient-free hydraulic pressure ramp is furnished to a reference sensor and to an in situ process sensor under test. The response time is obtained by measuring the time delay between the two sensors to produce an electrical signal analogous to a pre-determined pressure. Specifically, the process sensor under test is subjected to a relatively slowly changing hydraulic pressure ramp signal to determine an upper bound for process sensor response time over the range of all pressure transients to which the sensor is required to respond.

A hydraulic signal generator is disclosed providing linear positive and negative pressure ramp signals over the amplitude and rate range of displacement interest and which produces such signals independent of volumetric effects as found in in situ process sensors. The hydraulic signal generator includes a pressurizable gas reservoir, a pressurizable gas and liquid reservoir, a gate for rapidly opening a gas communication path between the two reservoirs, a throttle valve for regulating the rate of pressure equilization between the two reservoirs, and a relatively small cross section non-expansible output conduit providing hydraulic communication between the liquid/gas reservoir and reference and process sensors under test. By maintaining sufficient pressure differential between reservoirs and by maintaining a sufficient volume of gas in the liquid/gas accumulator, excellent linearity, controllability of rate, and freedom from transient oscillations can be achieved independent of the volumetric displacement of the pressure sensor.

BRIEF DESCRIPTION OF THE DRAWINGS

The invention may be best understood by reference to the following detailed description in conjunction with the accompanying drawings in which:

FIG. 1 shows a schematic diagram of a hydraulic signal generator according to the invention;

FIG. 2 illustrates a specific embodiment of a portable hydraulic signal generator suitable for in situ testing in a nuclear reactor; and FIG. 3 is a block diagram of an in situ time delay test configuration.

DETAILED DESCRIPTION OF SPECIFIC EMBODIMENTS

A hydraulic signal generator 10 is schematically depicted in FIG. 1. The generator 10 is particularly useful for generating linear positive and negative hydraulic ramp signals independent of pressure sensor hydraulic volumetric displacement. The generator 10 includes first accumulator 12, second accumulator 14, a conduit 16 coupling the first accumulator 12 with the second accumulator 14, a solenoid gate 18 in the conduit 16 between the accumulators 12 and 14, a throttle valve 20 in the conduit 16 between the solenoid gate 18 and the second accumulator 14, and a hydraulic output conduit 22 for coupling between the second accumulator and a process sensor 24 to be tested. In addition, a reference sensor 26 is coupled to the output conduit 22 in parallel to the process sensor 24. Parallel coupling permits comparison of response therebetween.

The first accumulator 12 is adapted to contain a gas such as nitrogen under a selected pressure, while the second accumulator 14 is adapted to contain a pressurized mixture of gas and a liquid such as nitrogen and water, which simulates the process fluid normally monitored by the process sensor 24. The nitrogen gas and liquid water maintain a state of equilibrium wherein the liquid occupies a lower sector 28 of the mixture accumulator 14 and the gas occupies an upper sector 30.

The solenoid gate 18 is normally in a closed condition so that accumulators 12 and 14 can be maintained at different selected internal pressures. The gate 18 is operative to open in response to an applied signal activating a magnetic coil 27. Opening of the gate 18 initiates pressure equalization between the accumulators 12 and 14.

The throttle valve 20 is functional for two purposes, First, when the gate 18 is opened, the throttle valve 20 regulates the rate of gas flow and therefore the rate of pressure equalization between accumulators 12 and 14. Second, where the throttle valve 20 is placed between the solenoid gate 18 and the second accumulator 14, the valve 20 acts as a low-pass filter, removing turbulence from the conduit 16 and therefore minimizing undesired disturbance to the fluid mixture in the second accumulator 14.

The generator 10 is operative as follows to provide linear ramp increase and decrease in hydraulic pressure in the output conduit 22: With the solenoid gate initially closed, the first accumulator 12 is pressurized by an external gas source (not shown) such as a nitrogen cylinder, to a pressure substantially different from the process sensor set point in the pressure range of interest. Where a positive ramp signal is to be generated, pressurization should be substantially above the set point pressure to assure adequate linearity for the purpose of time delay analysis. Conversely, where a negative ramp signal is to be generated, the first accumulator 12 is pneumatically pressurized to a pressure substantially below the set point pressure. The pneumatic pressure of the first accumulator 12 may be called the driving pressure.

The second accumulator 14 is similarily pressurized to a selected pressure, which may be called an initial condition pressure.

The relative rates and dynamic range of pressurization are selected by adjusting the minimum and maximum pressurization of the accumulators 12 and 14, by adjusting the pneumatic flow rate through throttle valve 20 and by adjusting the ratio of volumes of liquid and gas in accumulator 14. The relation $|P_{12} - P_{14}| = K|P_{s.p.} - P_{14}|$ where: $P_{12}$ is the pressure to which $P_{12}$ is pressurized; $P_{14}$ is the pressure to which $P_{14}$ is pressurized and is the initial pressure of the pressure ramp; $P_{s.p.}$ is the pressure of interest at which the process sensor response time is measured; K is a proportionality constant which is adjusted to ensure linearity of the pressure ramp waveform over the pressure range defined by the absolute value $|P_{s.p.} - P_{14}|$ is used to determine the proper relationship between $P_{12}$ and $P_{14}$. The proper liquid level in accumulator 14 can be established by selecting the minimum ramp rate signal at the highest test pressure and the maximum ramp rate signal at the lowest test pressure. The boundaries on pressure and ramp rate also determine the range of adjustment of the throttle valve 20.

A hydraulic ramp signal is initiated by opening gate 18 permitting pressure equalization between accumulators 12 and 14. The throttle valve 20 operates to regulate the rate of equalization within the selected range of interest. A linear pneumatic pressure change resulting from a substantially linear flow rate over the pressure range defined by the absolute value $|P_{s.p.} - P_{14}|$ through the throttle valve 20 is conveyed to the liquid in accumulator 14, which in turn conveys a linear hydraulic pressure change through the liquid media to the pressure sensor 24. Because initial turbulence in driving pressure is effectively isolated from the hydraulic fluid, by low-pass filtering of valve 20, the hydraulic signal is free of noise. In particular, since the throttle valve 20 is located on the pneumatic line 16 between the solenoid gate and the accumulator 14, shock waves emanating from the gate 18 as a result of its rapid opening are suppressed. Since the volumetric displacement of hydraulic fluid is negligible, and since the volume of gas in accumulator 12 is large compared to the volume of gas in accumulator 14, accumulator 12 tends to act as a constant pressure driving source over the pressure range of interest.

The hydraulic signal generator 10 is intended for use with a rapid response reference transducer, such as a diaphragm-type variable reluctance transducer as might be used for laboratory calibration. A reference transducer having known or at least repeatable characteristics provides a standard with which the in situ process transducers can be compared. In a practical instrument, the reference transducer can be incorporated into a package including the basic ramp generator in order to provide a self-contained test instrument for use at a testing site.

FIG. 2 illustrates a specific embodiment of a practical self-contained test instrument according to the invention hereinabove described. This instrument includes a gas accumulator 112 and a gas-water accumulator 114 mounted to a common rigid backing plate 115. The accumulators 112 and 114 comprise double-ended sealed tubular cylinders. The backing plate 115 is generally oriented to maintain the gas-water accumulator in a generally vertical orientation so that liquid can be filled and discharged at a lower end 132 and gas can be introduced and released at an upper end 134. A pneumatic conduit path 116 consisting of lengths of tubing couples the outlet of gas accumulator 112 to upper end 134 of gas-water accumulator 114. A solenoid gate 118, disposed in conduit path 116, and internal switching circuitry (a solenoid coil 119 coupled to an electrical power source and switch —not shown) is operative to block and unblock the pneumatic path of conduit 116. A continuously adjustable throttle valve 120 is coupled in pneumatic path 116 between the gate 118 and gas-water accumulator 114. The throttle valve 120 is used to adjust the desired rate of pressure equalization between accumulator cylinders 112 and 114.

At the lower end 132 of accumulator 114, an outlet conduit 122 is provided which supplies hydraulic fluid through a Tee connector 123 to an outlet port 125 for an external process sensor (not shown) under test and also to a reference sensor 126. The hydraulic output conduit 122 should preferably be a non-expandable relatively small diameter tube, such as one-eighth inch I.D. tubing. This construction is found to minimize the so-called sensing line effect which may otherwise become a source of transient oscillation. The use of a small diameter conduit effectively reduces the mass of fluid displaced in the line upon fluid pressurization or depressurization, thereby minimizing second-order transients at the hydraulic fluid output termination.

The reference sensor 126 should be rigidly mounted to backing plate 115 in a position permitting operator access thereto. One suitable reference sensor is the Validyne Model DP15TL multiple range variable reluctance transducer, which is manufactured by the Validyne Engineering Corporation of Northridge, California. This laboratory calibration reference sensor is operative with interchangable diaphragms and an output signal demodulator over the pressure ranges of interest, which are typically between 0 PSI and 3,000 PSI or between 0 PSIG and 3,000 PSIG.

The physical dimensions of a portable test instrument dictate that the reference sensor 126 be mounted in relatively close proximity to the solenoid coil 119. It is therefore preferable to mount the coil 119 and the magnetic elements of sensor 126 orthogonal to one another in order to prevent magnetic interaction which could cause false indication of pressure signal initiation.

Because of the wide pressure ranges over which the unit is required to operate, and the necessity to ensure sufficient vertical deflection of the optical output recorder in order to facilitate accurate reading of the time delay, it is desirable to use the unit with zero elevation voltage supplies in series with the electric outputs of both the process and reference sensors. Such supplies are adjusted such that the initial pressure ramp corresponds to an output voltage of zero. Use of this pseudo-zero then allows adjustment of the outputs of both sensors for maximum vertical deflection of the recorder at the pressure of interest (e.g., the process sensor setpoint).

The remaining elements of the instrument illustrated in FIG. 2 are principally provided for convenience of operation and for attachment of peripheral equipment and devices. A first coupling 136 is provided for gas pressurization of the accumulator 112 and 114. A cylinder of nitrogen gas (not shown) is generally suitable to provide the initial pneumatic pressurization. Conduits 138 and Tee interconnections 140 and 142 provide a gas inlet to pneumatic path 116 which bypasses solenoid 118 and throttle valve 120. Such a bypass permits rapid pressurization of both accumulators 112 and 114 without the interposition of the throttle valve 120. A second coupling 144 provides access to conduit 138 for an instrument to measure pneumatic pressure in accumulators 112 and 114. Third and fourth coupling 146 and 148 provide drain outlets for the lower ends of accumulators 112 and 114 respectively. A gas bleed 150 is provided adjacent accumulator upper end 134.

Water fill is provided through a conduit 152 which may be opened at a level above the accumulator 114 to supply liquid to the accumulator lower end 132. In addition, a transparent standpipe 154 is coupled to accumulator lower end 132 for providing visual indication of the relative level of gas and water in accumulator 114. Standpipe 154 is generally vertically disposed in parallel to accumulator 114 at an operator-viewable location. Each of the peripheral couplings and conduits hereinabove described is provided with a ball cut-off valve 156. The ball valves 156 isolate conduit paths between the accumulators 112 and 114 and between accumulator outlet 122 and peripheral couplings.

The particular application and testing procedure useful with this instrument is thus explained in conjunction with FIG. 3. FIG. 3 shows a test setup with the hydraulic test signal generator 10, having integral therewith the reference transducer 26. Fill water 170 is provided for the gas-water accumulator (not shown) with generator 10. A high pressure gas source 172 provides pressure through a pressure regulator 174 to the generator 10. For calibration, a low pressure gas source 176 provides gas through a pneumatic calibrator 178 to the generator 10.

The generator 10 provides fluid to the process sensor under test 24. (Coupling is provided through a suitable Tee connector 180 in process line 182. The section of the process line 182 in which the process sensor 24 is found is isolated from the balance of the hydraulic circuit line by closing main line valves 184 and 186 and by opening a tap line valve 185.)

The output signal of process sensor 24 is provided to one channel of D.C. amplifier 188 and a reference is provided from reference sensor 26 to another channel of D.C. amplifier 188. The output of D.C. amplifier 188 is provided to a suitable recording device such as an output strip chart recorder 190. The electrical output signals may be processed in any number of ways. For example, the process sensor 24 and the reference sensor 26 signals may be directly recorded on a strip chart and thereafter compared to determine the extent of time delay. On the other hand, the reference sensor 26 signal and process sensor 24 signal might be scaled and processed through a differential circuit in order to provide a direct difference signal whose magnitude would indicate the magnitude of time delay between the respective signals.

In testing a process sensor utilizing a linear ramp, it is advisable to verify time delay at at least two substantially different pressure equalization rates. Testing at different equalization rates is necessary to analyze the peculiar dynamic response of a process sensor, such as the inertial characteristic of the sensor's internal movements, the friction effects of internal movement bearings, the effects of fluid viscosity and possible degradation due to internal corrosion or accumulation of foreign matter. For example, a sensor exhibiting significant inertia will appear to have a longer response time when tested with a step input than it would if it were tested with a slow ramp input. Consequently, a recommended test procedure for two sequential ramp input signals (i.e., a slow ramp and then a fast ramp) to establish an upper bound for the process sensor response time.

Having thus described the invention, the advantages and usefulness thereof should be apparent to the ordinary mechanic skilled in the art. In particular, an instrument has been described which is useful for in situ measurement of process sensor time delay. In particular, an instrument has been described which produces a linear ramp hydraulic signal essentially independent of sensor volumetric displacement and which if found to be suitable for accurate measurement of time delays of substantially less than 100 milliseconds. Modifications and variations will be obvious to those of ordinary skill in the art in view of the present specification. Therefore, it is not intended that the invention be limited except as indicated by the appended claims.

I claim:

1. A hydraulic signal generator for use in in situ verification of the response time of a hydraulic process sensor comprising a first reservoir for containing a gas under pressure; a second reservoir for containing a gas and a liquid under pressure; conduit means connecting said first and second reservoirs for communicating gas between said first and second reservoirs; means in said conduit means intermediate of said reservoirs for gating said conduit means; throttle means in said conduit means intermediate of said reservoirs for providing substantially linear pneumatic pressure equalization in the pressure ranges of interest between said reservoirs; and non expansible outlet means coupled to said second reservoir for providing hydraulic fluid communication between said second reservoir and said process sensor.

2. A hydraulic signal generator according to claim 1, wherein said throttle means comprises a valve disposed between said gating means and said second reservoir, for inhibiting fluid turbulence in said conduit means and in said second reservoir caused by said gating means.

3. A hydraulic signal generator according to claim 2, wherein the gas volume capacity of said first reservoir is large in relation to the gas volume capacity of said second reservoir and the volumetric displacement capacity of said process sensor, such that said generator is operative as a constant pressure driving source over the pressure range of interest.

4. A hydraulic signal generator for use in in situ verification of the response time of a hydraulic process sensor comprising: a first reservoir for containing a gas under pressure; a second reservoir for containing a gas and a liquid under pressure; conduit means connecting said first and second reservoirs for communicating gas between said first and second reservoirs;

means in said conduit means intermediate of said first and second reservoirs for gating said conduit means; throttle means in said conduit means intermediate of said reservoirs for providing substantially linear pneumatic pressure equalization between said reservoirs in pressure ranges of interest; outlet means coupled to said second reservoir for providing hydraulic fluid communication between said second reservoir and said process sensor; and a reference sensor coupled to said second reservoir for providing a reference signal for comparison with an output signal of said process sensor, said generator being of sufficient hydraulic fluid volume relative to the process sensor and to said reference sensor to be capable of generating signals whose waveform and rate of change are essentially independent of the volumetric displacement of the process and reference sensors.

5. A hydraulic signal generator for use in in situ verification in response time of a hydraulic process sensor under test comprising a first accumulator for containing a gas under pressure; a second accumulator for containing a gas and liquid under pressure and having an outlet coupled to said process sensor for supplying hydraulic fluid thereto, said first and second accumulators each having a volume substantially greater than the total volumetric displacement of said process sensor; a non-expansible conduit coupled between said accumulators for communicating gas between said accumulators; a solenoid valve disposed in said conduit between said accumulators for opening and closing a pneumatic communication path between said accumulators; an adjustable throttle valve disposed in said conduit between said solenoid valve and said second accumulator for equalizing pneumatic pressure between said accumulators at a constant rate over the pressure range of interest and for isolating solenoid valve-induced fluid turbulence from said second accumulator; and a non-expansible hydraulic fluid conduit coupled to a hydraulic fluid outlet of said second accumulator for communicating hydraulic fluid between said second accumulator and said process sensor under test.

6. Apparatus according to claim 5, further including a reference sensor and a non-expansible conduit coupled between said reference sensor and said second accumulator outlet for communicating hydraulic fluid between said reference sensor and said second accumulator.

7. Apparatus according to claim 6, further including means for pneumatically pressurizing the first accumulator and means for pneumatically pressurizing the second accumulator to a pressure differing from said first accumulator by a sufficient amount to ensure adequate linearity of the hydraulic waveform.

8. Apparatus according to claim 6, further including means for establishing the pressurized pneumatic volume of the second accumulator substantially greater than the combined volumetric displacement of said process sensor and said reference sensor.

9. Apparatus according to claim 8, wherein said accumulators are mounted rigidly with respect to one another for preventing relative oscillation therebetween.

10. Apparatus according to claim 6, wherein said reference sensor is a variable reluctance sensor including a magnetically sensitive transducer element and wherein said reference sensor is mounted with the magnetically sensitive element orthogonal to magnetic fields emanating from said solenoid valve.

11. Apparatus according to claim 5, wherein said throttle valve is located in said conduit between said gate valve and said second accumulator for inhibiting gate-valve induced turbulence in said conduit and in said second reservoir.

12. A method for generating a linear ramp hydraulic signal with a first pressurizable reservoir, a second pressurizable reservoir, a fluid conduit connecting said reservoir, a gate valve in said conduit for opening fluid communication between said reservoirs, a throttle valve in said conduit for regulating the rate of pressure equalization between said reservoirs and an outlet in said second reservoir for communicating hydraulic fluid pressure to a hydraulic pressure sensing device having substantially smaller volumetric displacement than the volume of said reservoirs to compare the response time of a hydraulic process sensor in situ in a nuclear reactor with the response time of a reference sensor, said method comprising the steps of: pressurizing said first reservoir with a gas; pressurizing said second reservoir with a gas and a liquid pressure substantially different from the pressure in said first reservoir, communicating hydraulic fluid under pressure between said sensors and said second reservoir; thereafter rapidly opening said conduit to establish a pneumatic communication path between said first and second reservoirs; while regulating, through said throttle valve, the pneumatic pressure equalization between the first and second reservoirs at an essentially constant rate over the pressure range of interest to generate a linear ramp change in hydraulic pressure at the sensors.

13. A method according to claim 12, further including establishing the pneumatic pressure in said first reservoir at a pressure sufficient to ensure adequate linearity of the hydraulic signal.

14. A method according to claim 13, further comprising the steps of obtaining an electrical output signal from the reference sensor representative of response to the applied bydraulic pressure ramp signal, obtaining an electrical output signal from the process sensor representative of response to the applied hydraulic pressure signal, and comparing the respective output signals, whereby the time difference therebetween is determined for verifying response time of the process sensor.

15. A method according to claim 14, further including the steps of at least temporarily storing the reference sensor response and the process sensor response for comparison therebetween.

16. A method according to claim 12, wherein said regulating step further includes the step of inhibiting gate-valve induced fluid turbulence in said conduit and in said second reservoir by locating said throttle valve in said conduit between said gate valve and said second accumulator.

17. A method for testing the response time of a hydraulic process sensor in a nuclear reactor hydraulic fluid circuit comprising: hydraulically isolating said process sensor in situ; pressurizing a first reservoir containing a gas; pressurizing a second reservoir containing a gas and a liquid to a pressure sufficient to ensure adequate linearity of the hydraulic signal, said second reservoir being coupled to said first reservoir by a gated conduit; opening hydraulic communication between said second reservoir and the process sensor and between the second reservoir and a reference sensor; setting a throttle valve in said conduit between said first and second reservoirs for a first essentially constant pneumatic equalization rate over the pressure range of interest; thereafter rapidly opening said gated conduit to establish a pneumatic communication path between said reservoirs while regulating the rate of pressure equalization with said valve at said first essentially constant equalization rate over the pressure range of interest to effect a first linear ramp change in hydraulic pressure at the sensors; sensing and recording the response of said sensors to compare the time delay therebetween at said rate of said first ramp change; again pressurizing said first reservoir containing a gas; again pressurizing said second reservoir containing a gas and a liquid to a pressure sufficient to ensure adequate linearity of the hydraulic signal, setting said throttle valve for a second substantially different constant pneumatic pressure equalization rate; thereafter rapidly opening said gated conduit to establish a pneumatic communication path between said reservoirs while regulating the rate of gas pressure equalization at said second equalization rate to effect a second linear ramp change in hydraulic pressure at the sensors; and sensing and recording the response of said sensors to compare the time delay therebetween at a second ramp rate, thereby to establish the time delay characteristics of the hydraulic process sensor under test.

18. A hydraulic signal generator for use in in situ verification of response time of a hydraulic process sensor under test comprising: a first accumulator for containing a gas under pressure; a second accumulator for containing a gas and liquid under pressure and having an outlet coupled to said process sensor for supplying hydraulic fluid thereto, said first and second accumulators each having a volume substantially greater than the total volumetric displacement of said process sensor; a conduit coupled between said accumulators for communicating gas between said accumulators; an externally actuable valve disposed in said conduit between said accumulators for opening and closing a pneumatic communication path between said accumulators; an adjustable throttle valve disposed in said conduit between said externally actuable valve and said second accumulator for equalizing pneumatic pressure between said accumulators at a constant rate over a pressure range of interest and for isolating fluid turbulence; and a non-expansible hydraulic fluid conduit coupled to a hydraulic fluid outlet of said second accumulator for communicating hydraulic fluid between said second accumulator and said process sensor under test.

* * * * *